United States Patent [19]

Nishida et al.

[11] 4,341,874

[45] Jul. 27, 1982

[54] $Si_3N_4$ CERAMIC POWDER MATERIAL AND METHOD FOR MANUFACTURING THE SAME

[75] Inventors: Katsutoshi Nishida; Michiyasu Komatsu, both of Yokohama; Tadashi Miyano, Sagamihara, all of Japan

[73] Assignee: Tokyo Shibaura Electric Co., Ltd., Kawasaki, Japan

[21] Appl. No.: 221,813

[22] Filed: Dec. 31, 1980

Related U.S. Application Data

[60] Division of Ser. No. 78,584, Sep. 27, 1979, Pat. No. 4,284,432, which is a continuation of Ser. No. 867,299, Jan. 5, 1978, abandoned.

[51] Int. Cl.[3] .......... C04B 35/58

[52] U.S. Cl. .......... 501/97

[58] Field of Search .......... 106/73.2, 73.4, 73.5; 501/97

[56] References Cited

U.S. PATENT DOCUMENTS

| | | | |
|---|---|---|---|
| 3,830,652 | 8/1974 | Gazza | 106/73.2 |
| 3,835,211 | 9/1974 | Coe et al. | 423/344 |
| 3,836,374 | 9/1974 | Richerson et al. | 106/73.5 |
| 3,969,125 | 7/1976 | Komeya et al. | 106/73.2 |
| 3,992,497 | 11/1976 | Terwilliger | 106/73.5 |
| 4,046,580 | 9/1977 | Isbii et al. | 106/73.2 |
| 4,071,371 | 1/1978 | Milberg et al. | 106/73.2 |

FOREIGN PATENT DOCUMENTS

| | | | |
|---|---|---|---|
| 2621523 | 11/1976 | Fed. Rep. of Germany | 106/73.2 |
| 970639 | 3/1961 | United Kingdom | 423/344 |

OTHER PUBLICATIONS

Chemiker-Zeitung, vol. 95, 1971, No. 22 p. 932.

Ber. Dt. Keram. Ges., 51, 1974, No. 5, pp. 127–130: Feld et al.

Ceramic Bulletin, vol. 54, No. 9, 1975, p. 780.

*Primary Examiner*—Mark Bell

*Attorney, Agent, or Firm*—Cushman, Darby & Cushman

[57] ABSTRACT

Ceramic powder material mainly consists of silicon nitride wherein the content of oxygen combined with generally unavoidable impurities as measured by activation analysis accounts for less than 2% by weight. The above-mentioned ceramic powder material can also be prepared preferably by the method which comprises the step of heating raw ceramic powder material mainly consisting of silicon nitride to 1,400° C. to 1,900° C. in the presence of a separately prepared nonsintered molding of ceramic material or sintered molding of ceramic material having a porosity of at least 10%.

2 Claims, No Drawings

$Si_3N_4$ CERAMIC POWDER MATERIAL AND METHOD FOR MANUFACTURING THE SAME

CROSS-REFERENCE TO RELATED APPLICATIONS

This application is a division of our earlier application Ser. No. 78,584 filed Sept. 27, 1979, now U.S. Pat. No. 4,284,432, which in turn is a continuation of our earlier application Ser. No. 867,299 filed Jan. 5, 1978, now abandoned.

This invention relates to improvements on raw ceramic powder material adapted to provide a sintered ceramic product of high mechanical strength and more particularly to improvements on raw ceramic powder material mainly consisting of silicon nitride.

Worldwise studies are made of sintered silicon nitride which displays prominent mechanical strength at high temperature. Known processes developed to this end include, for example, that which hot-presses silicon nitride powder mixed with magnesia, and that which similarly hot-presses silicon nitride powder mixed with yttria. These processes are found to provide a dense sintered product of silicon nitride. However, a more dense construction does not offer excellent mechanical strength at high temperature. The reason is that a simply densified sintered product contains glassy material, which gives rise to a decline in the high temperature mechanical strength of the product.

The present inventor has studies the optimum composition of raw ceramic powder material to decrease the content of glassy component, and accomplished this invention.

It is accordingly an object of this invention to provide raw ceramic powder material adapted to manufacture a sintered product having excellent mechanical strength at high temperature.

Another object of the invention is to provide such raw ceramic powder material as enables the content of glassy material in a sintered product to be decreased.

Still another object of the invention is to provide a method for efficiently preparing the above-mentioned raw ceramic powder material.

The other objects will be apparent from the following description.

The fundamental technical concept of this invention is to restrict the content of oxygen in the raw ceramic powder material. Silicon nitride powder contains various kinds of impurities, and is not formed of silicon and nitrogen alone. For instance, silica is generally deposited on the surface of the particles of silicon nitride powder. Further, iron and calcium, for example, are often present in the silicon nitride powder as unavoidable impurities. Many of these impurities are generally present in raw ceramic powder material in the form combined with oxygen. The resultant oxides are supposed to cause a decline in the high temperature mechanical strength of a sintered product.

The present inventor has carried out various experiments and as the result has considered that particularly an amount of oxygen combined with the above-mentioned unavoidable impurities raises problems. It has been found that raw ceramic powder material mainly consisting of silicon nitride and containing less than 2.0% by weight (as measured by activation analysis) of oxygen combined with unavoidable impurities is adapted to provide a sintered product having prominent high temperature mechanical strength. It has also been disclosed that it is advised to decrease an amount of oxygen combined with the unavoidable impurities preferably to less than 1.0% by weight or most preferably to less than 0.5% by weight. Further, it has been shown that raw silicon nitride powder having the above-mentioned excellent property can be prepared by being heated to a temperature ranging between 1,400° C. and 1,900° C., preferably between 1,500° C. and 1,850° C., or more preferably between 1,550° C. and 1,800° C.

With raw silicon nitride powder mixed with alumina and yttria, experiments indicate that where the content of aluminium ranges between 0.05 and 2.5% by weight, and the content of yttrium ranges from 0.4 to 8.0% by weight as analyzed by the customary process; the total % by weight $W_O$ of oxygen as measured by activation analysis satisfies the following formula indicating the % by weight $W_{Al}$ of aluminium and the % by weight $W_Y$ of yttrium:

$$W_O \leqq X + 1.5 \times \left( W_{Al} \times \frac{\text{atomic weight of oxygen}}{\text{atomic weight of aluminium}} + W_y \times \frac{\text{atomic weight of oxygen}}{\text{atomic weight of yttrium}} \right)$$

,ps and X is smaller than or equal to 2.0, then it is possible to produce a sintered product of excellent property. The term X given in the above formula is desired to have a smaller value than 1.0 or most preferably 0.5.

For preparation of desired raw ceramic powder material from silicon nitride powder mixed with alumina and yttria, it is advised to heat raw silicon nitride powder containing 0.1 to 5% by weight of alumina and 0.5 to 10% by weight of yttria to a temperature ranging between 1,400° C. and 1,900° C., preferably between 1,500° C. and 1,850° C., or more preferably between 1,550° C. and 1,800° C.

Where silicon nitride powder containing alumina and yttria is heated, it is preferred that part or the whole of yttrium be present in the heated mass in the form of a crystalline compound consisting of silicon nitride and yttrium oxide. The presence of this crystalline compound can be ascertained by the X-ray diffraction analysis. For the growth of said crystalline compound, it is advised to apply heating at a higher temperature than 1,600° C.

The raw ceramic powder material can be heated in a far shorter time than in the prior art, if said heating is carried out in the presence of a nonsintered molding of ceramic material or a sintered molding of ceramic material having a porosity of at least 10%. The ceramic material molded in the sintered or nonsintered form includes aluminium nitride, boron nitride, titanium nitride, silicon nitride and aluminium oxide. Among the above-listed compounds, aluminium nitride displays the most prominent effect of shortening heating time.

Application of the above-mentioned nonsintered or sintered ceramic molding causes oxygen-containing gas evolved from heated raw ceramic powder material to be securely absorbed in said molding or to be given off to the outside therethrough, thereby supposedly carrying out effective deoxidation.

It is preferred that the above-mentioned heating be undertaken by charging the raw ceramic powder material and the aforesaid molding in a vessel made of such material as is nonreactive with the charged mass. The desired vessel is made of aluminium nitride. Heating is carried out in a nonoxidizing atmosphere such as nitrogen gas or any other inert gas.

The nonsintered ceramic molding acting as a heating time reducer is prepared by mixing said material with an organic binder, followed by molding. The nonsintered ceramic molding acting as a heating time reducer generally has a porosity ranging approximately between 35 and 55%. For the object of this invention, however the nonsintered molding can be produced with a porosity falling outside of the above-mentioned range. A sintered ceramic molding acting as a heating time reducer having a porosity of at least 10% can be prepared by heating said nonsintered molding at a high temperature in a nonoxidizing atmosphere.

Table 1 below shows the examples of the methods of manufacturing a heating time reducer from nonsintered and sintered moldings of aluminium nitride with various degrees of porosity.

TABLE 1

| Form of heating time reducer | Porosity (%) | Manufacturing method |
|---|---|---|
| Nonsintered | 70 | Commercially available aluminium nitride powder is pulverized in a ball mill. An organic binder is added to the pulverized mass, followed by molding at a pressure of 50 to 100 $Kg/cm^2$. |
| " | 50 | Substantially the same process as described above is used, except that the pressure applied ranges between 500 and 700 $Kg/cm^2$. |
| " | 30 | Coarse aluminium nitride particles and fine aluminium nitride particles are mixed in the ratio of 7:3. An organic binder is added to the mixture, followed by molding at a pressure of 5,000 $Kg/cm^2$. |
| Sintered | 50 | The above-mentioned nonsintered aluminium nitride having a porosity of 70% is sintered one hour at 1,7000° C. in an atmosphere of nitrogen. |
| " | 30 | The above-mentioned nonsintered aluminium nitride having a porosity of 50% is sintered two hours at 1,800° C. in a atmosphere of nitrogen. |
| " | 10 | 0.5% by weight of yttria is added to fine aluminium nitride powder. After molded, the mass is sintered two hours at 1,800° C. in an atmosphere of nitrogen. |
| " | 8 | 2% by weight of yttria is added to fine aluminium nitride powder. After molded, the mass is sintered two hours at 1,750° C. in an atmosphere of nitrogen. |

The nonsintered or sintered molding acting as a heating time reducer used in this invention need not be formed of a single compound, but may be prepared in the form mixed with, for example, yttria, alumina or silica. However, it is preferred that these ingredients be added in a smaller amount than 20% by weight. The reason is that where the heating time reducer contains a large amount (more than 20%) of the additives, then undesirable reactions will occur between said additives and the raw ceramic powder.

This invention will be more fully understood by reference to the examples which follow.

EXAMPLE 1

Raw silicon nitride powder formed of 58.6% by weight of silicon, 36.1% by weight of nitrogen, 4.3% by weight of oxygen, 0.25% by weight of iron and 0.21% by weight of calcium was heated one hour at 1,700° C. while being placed in a vessel made of aluminium nitride. (The content of oxygen was determined by activation analysis, the content of nitrogen by a gas analyzer, and the content of the other elements by the customary wet analytic method.) As the result, there was obtained a raw ceramic powder formed of 59.2% by weight of silicon, 36.9% by weight of nitrogen, 1.8% by weight of oxygen, 0.28% by weight of iron and 0.25% by weight of calcium.

2% by weight of alumina and 5% by weight of yttria were added to nonheated raw ceramic powder as well as to heated raw ceramic powder whose oxygen content was decreased. After molded, the respective masses were sintered 2 hours at 1,800° C. at a pressure of 500 $Kg/cm^2$.

A sintered product of nonheated raw silicon nitride powder indicated a flexural strength of 53 $Kg/mm^2$ at 1,200° C. On the other hand, a sintered product of previously heated raw silicon nitride powder whose oxygen content was reduced showed a flexural strength of 75 $Kg/mm^2$ at 1,200° C. The flexural strength test was carried out by the three-point bending method under the following conditions:

| | |
|---|---|
| Sample size | 3 × 3 × 35 mm |
| Span | 20mm |
| Crosshead speed | 0.5 mm/min |

EXAMPLE 2

Raw silicon nitride powder was sintered in substantially the same manner as in Example 1, except that a nonsintered molding of a heating time reducer of aluminium nitride was mixed with said raw silicon nitride powder and heating was applied for 30 minutes, obtaining the same result as in Example 1. In this case, application of the nonsintered molding of the heating time reducer of aluminium nitride decreased heating time by half. Where the nonsintered molding of aluminium nitride was replaced by a sintered molding of aluminium nitride having a porosity of at least 10%, the same result was obtained.

EXAMPLE 3

There was prepared raw ceramic silicon nitride powder containing 2.5% by weight of alumina and 4.8% by weight of yttria. The mass was placed in a vessel made of aluminium nitride, followed by heating of 2 hours at 1,750° C. As analyzed by the same methods as applied in Example 1, the heated mass was formed of 55.7% by weight of silicon, 1.3% by weight of aluminium, 3.8% by weight of yttrium, 0.31% by weight of iron, 0.26% by weight of calcium, 32.6% by weight of nitrogen and 2.6% by weight of oxygen. As analyzed by X-ray diffraction, a crystalline compound of silicon nitride and yttria ($Si_3N_4.Y_2O_3$) having a molar ratio of 1:1 was grown in the heated mass. It was found that 90% of the yttrium content in the raw ceramic powder was present in the form of said silicon yttrium oxynitride crystal compound.

After molded, the raw ceramic powder was sintered 2 hours at 1,800° C. at a pressure of 500 Kg/cm². The same flexural strength test as applied in Example 1 proved the sintered product to have a flexural strength of 92 Kg/mm² at 1,200° C.

EXAMPLE 4

Raw silicon nitride ceramic powder was heated in substantially the same manner as in Example 3, except that a nonsintered molding of a heating time reducer of aluminium nitride was mixed with said raw silicon nitride powder and heating was applied for 70 minutes, effecting deoxidation as much as in Example 3. Where the nonsintered aluminium nitride was replaced by sintered aluminium nitride having a porosity of at least 10%, the same degree of deoxidation was realized.

EXAMPLE 5

Silicon nitride of the CP-85 grade manufactured by Advanced Materials Engineering Ltd. of England was used as a starting material. X-ray diffraction analysis showed said starting material to contain 87% of $\alpha$-type silicon nitride, whose particle size was determined to be 1.8 microns by the Fisher Sub-Sieve Sizer. Further, said starting material was analyzed to be formed of the following elements.

| Element | Silicon | Nitrogen | Aluminium | Iron | Calcium | Oxygen |
|---|---|---|---|---|---|---|
| % by weight | 57.8 | 35.5 | 0.23 | 0.35 | 0.11 | 3.51 |

In this case, the oxygen content was determined by activation analysis, the nitrogen content by gas analysis and the content of the other elements by the customary chemical analysis. (Analysis described hereinafter was carried out in the same manner).

5% by weight of $Y_2O_3$ was added to the raw silicon nitride powder followed by crushing and mixing for 100 hours in an alumina pot filled with alumina balls. The abraded portions of the alumina pot and alumina balls were carried into the crushed silicon nitride powder now mixed with $Y_2O_3$, with the resultant increase in the alumina content. The crushed silicon nitride powder had a particle size of 1.1 microns as measured by the Fisher Sub-Sieve Sizer, and was analyzed to contain the following elements:

| Element | Silicon | Nitrogen | Aluminium | Iron | Calcium | Yttrium | Oxygen |
|---|---|---|---|---|---|---|---|
| % by weight | 56.5 | 34.7 | 1.31 | 0.32 | 0.10 | 3.69 | 5.31 |

The above-mentioned raw mixed ceramic powder was charged in an aluminium nitride vessel, followed by heating for 2 hours at 1,730° C. The heated mass was analyzed by X-ray diffraction to contain a silicon yttrium oxynitride crystal compound ($Si_3N_4.Y_2O_3$). A calibration curve showed that 80% of the $Y_2O_3$ added to the raw silicon nitride powder was present in the form of said $Si_3N_4.Y_2O_3$ compound. The heated raw mixed ceramic powder was analyzed to contain the following elements:

| Element | Silicon | Nitrogen | Aluminium | Iron | Calcium | Yttrium | Oxygen |
|---|---|---|---|---|---|---|---|
| % by weight | 56.6 | 35.1 | 1.26 | 0.30 | 0.09 | 3.71 | 2.65 |

The heated raw powder was sintered 2 hours by the customary hot press process at a temperature of 1,800° C. and a pressure of 400 Kg/cm². Samples were cut out of the sintered mass. The same flexural strength test as applied in Example 1 showed the samples to have a flexural strength of 85 Kg/mm² at 1,200° C., that is, a prominent heat resistance.

EXAMPLE 6

The raw mixed silicon nitride powder used in Example 5 was heated with a nonsintered or sintered molding of heating time reducer of aluminium nitride embedded in said raw powder. In this case, the porosity of the heating time reducer of aluminium nitride was varies as 8%, 10%, 30%, 50% and 70%. Heating was continued 2 hours at 1,650° C. The oxygen content of the samples of the heated raw mixed silicon nitride powder and the flexural strength thereof as measured at 1,200° C. by the same process as applied in Example 5 are set forth in Table 2 below.

TABLE 2

| Form of heating time reducer | Porosity (%) | Oxygen content (% by weight) | Flexural strength at 1,200° C. (Kg/mm²) |
|---|---|---|---|
| Sintered | 8 | 3.77 | 63 |
| " | 10 | 3.54 | 75 |
| Nonsintered | 30 | 2.60 | 86 |
| " | 50 | 2.32 | 92 |
| " | 70 | 2.41 | 90 |

A heating time reducer of aluminium nitride whose porosity exceeded 70% undesirably presented difficulties in handling. A heating time reducer of aluminium nitride whose porosity was smaller than 10% was unadapted for reuse and industrially unacceptable. Where the oxygen content of raw silicon nitride powder was to be decreased to a desired level, then said powder had to be heated long. Based on 30-minute heating, the heating time reducer of aluminium nitride decreased the oxygen content of raw silicon nitride powder to 4.4% when having a porosity of 8% and to 4.0% when having a porosity of 10%.

EXAMPLE 7

A nonsintered molding of a heating time reducer of aluminium nitride having a porosity of 55% and a molding of a heating time reducer of finely pulverized aluminium nitride which was sintered at 1,800° C. with a porosity of 30% were embedded in the raw silicon nitride powder used in Example 5, followed by heating of 2 hours at 1,650° C. The raw silicon nitride powder thus heated indicated an oxygen content of 2.45% by weight.

A nonsintered molding of a heating time reducer of aluminium nitride whose porosity indicated 50% before used in Example 6, but fall to 45% after said application, and a fresh nonsintered molding of a heating time reducer of aluminium nitride having a porosity of 50% were jointly embedded in the raw silicon nitride powder used in Example 5, followed by heating of 2 hours at 1,650° C. Then the oxygen content of said heated raw silicon nitride powder accounted for 2.35%. Both samples of raw silicon nitride powder heated for deoxidation were sintered by hot press, providing sintered products of high heat resistance.

What we claim is:

1. A ceramic powder material consisting essentially of silicon nitride powder consisting essentially of from 0.05 to 2.5% by weight of aluminium and from 0.4 to 8.0% by weight of yttrium, in which all or a part of the yttrium contained in the silicon nitride powder is present in the form of a crystalline compound of silicon nitride and yttrium oxide and in which the total oxygen content $W_O$ (% by weight) as measured by activation analysis falls within the range expressed by the following formula denoting the relationship between the content of aluminium $W_{Al}$ (% by weight) and the content of yttrium $W_Y$ (% by weight):

$$W_O \leqq 2.0 + 1.5 \times \left( W_{Al} \times \frac{\text{atomic weight of oxygen}}{\text{atomic weight of aluminium}} + W_Y \times \frac{\text{atomic weight of oxygen}}{\text{atomic weight of yttrium}} \right).$$

2. The ceramic powder material according to claim 1, wherein the crystalline compound is a silicon yttrium oxynitride crystal compound ($Si_3N_4.Y_2O_3$).

* * * * *

UNITED STATES PATENT AND TRADEMARK OFFICE
CERTIFICATE OF CORRECTION

PATENT NO. : 4,341,874

DATED : July 27, 1982

INVENTOR(S) : NISHIDA, K. et al

It is certified that error appears in the above-identified patent and that said Letters Patent are hereby corrected as shown below:

On the title add Item [30]:

[30] Foreign Application Priority Data

Jan. 13, 1977 [JP] Japan .................... 1949/77

Sept. 22, 1977 [JP] Japan .................... 113235/77

Signed and Sealed this

*Twenty-fourth* Day of *May 1983*

[SEAL]

*Attest:*

DONALD J. QUIGG

*Attesting Officer* *Acting Commissioner of Patents and Trademarks*